Aug. 31, 1943.   E. G. LAFFLY   2,328,468
COUPLING DEVICE FOR THE ASSEMBLY OF TUBULAR ELEMENTS
Filed July 24, 1941
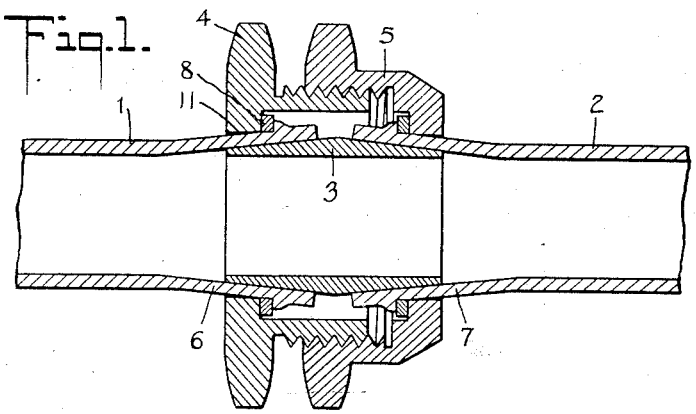
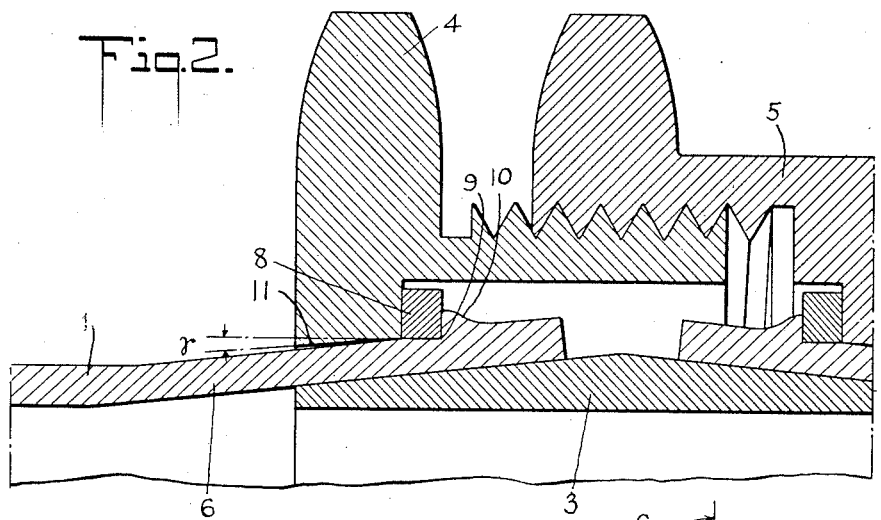
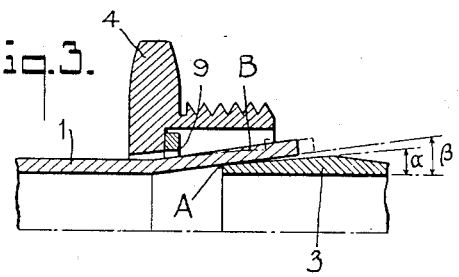
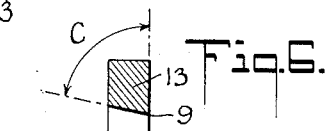
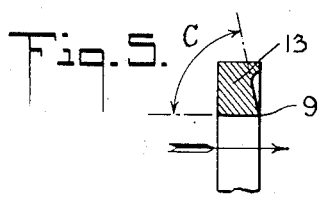
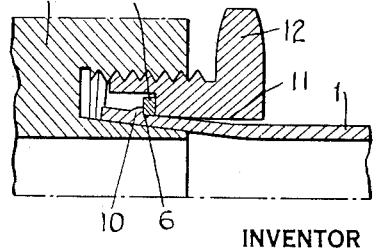
INVENTOR
Edmond Gabriel Laffly
BY
Henry J. Lucke
HIS ATTORNEY Patented Aug. 31, 1943

2,328,468

UNITED STATES PATENT OFFICE 2,328,468

COUPLING DEVICE FOR THE ASSEMBLY OF TUBULAR ELEMENTS

Edmond Gabriel Laffly, Paris, France; vested in the Alien Property Custodian

Application July 24, 1941, Serial No. 403,856
In France December 7, 1940

5 Claims. (Cl. 285—126)

The present invention relates to coupling devices for the assembly of tubular elements (such as pipes, tubes, conduits, etc.), that is to say devices for either coupling these elements with one another or fixing them to parts or structures (such as cocks, tanks, etc.).

This invention is concerned with devices of the kind in which the assembly is obtained by wedging of conical surfaces, or at least having oblique generatrices, carried by the ends or portions to be assembled together.

The chief object of the present invention is to provide coupling devices of this kind which are better adapted to meet the requirements of practise than those used for the same purpose up to the present time and in particular which are more reliable and safer and permit of avoiding uncoupling of the parts.

According to an essential feature of the present invention, in order to transmit the tightening effort, I make use of rings capable, at the end of the tightening operation, of penetrating slightly into the matter of which the parts to be assembled together are made.

According to another feature of the present invention, in order to assemble parts by means of coupling devices made as above explained, I give the conical end of the pipe or tube to be assembled an angularity or slope slightly different from that of the support on which the pipe is to be fixed, whereby the tightening can advantageously take place gradually, by stretching the pipe or tube by means of a ring such as that used according to a first characteristic of the invention as just above set forth.

According to a third feature of the invention, the axial section of the pieces intended to transmit the tightening effort, and in particular of the rings above mentioned, is made of such a shape that their active edge forms an angle at most equal to 90°, and preferably a slightly acute angle.

Other features of the present invention will result from the following detailed description of some specific embodiments thereof.

Preferred embodiments of the present invention will be hereinafter described, with reference to the accompanying drawing, given merely by way of example, and in which:

Fig. 1 is an axial sectional view of two adjacent ends of two pipes, respectively, and of a coupling device for assembling these pipes together, this coupling device being made according to the invention;

Fig. 2 is a part view of the same system, shown on an enlarged scale;

Fig. 3 is a separate view showing certain parts of the system, in the respective positions they occupy with respect to each other at the beginning of the operation of assembly;

Fig. 4 is a part view, in axial section, with a coupling device of the "male nut" type made according to the invention;

Fig. 5 is a detail view showing an element of a coupling device made according to the present invention, this element being different from the corresponding element of the system illustrated by Fig. 1 to 4;

Fig. 6 is a view similar to Fig. 5 and corresponding to a modification.

In the following description, it will be supposed that it is desired to provide a coupling device for the assembly of two elements at least one of which is constituted by a pipe, while the other is constituted, for instance, by the nozzle of a cock or of a container, or by another pipe. The coupling device according to the invention will be made as follows:

The end of the pipe to be assembled is given a conical shape, in the known manner, and this end is fitted on a support which is itself of conical shape, after which the whole is tightened so as to bring the two conical surfaces together and to produce the wedging thereof.

But, for this tightening operation, instead of directly transmitting the tightening efforts to the parts in question, as has been done up to this time, I have recourse, according to one of the features of the invention, to at least one intermediate element advantageously constituted by a ring previously engaged on the corresponding end of the pipe.

According to another feature of my invention which is preferably used in combination with that above mentioned, the end of the pipe is made of a conicity slightly different from that of the element, also of conical shape, on which it is to bear, the two cones fitting in each other only under the effect of the stresses developed during the tightening operation.

It is clear that a coupling device embodying the characteristics above mentioned can be made in many different ways.

For instance, supposing, by way of example, that it is desired to assemble together two pipe ends 1 and 2 (Fig. 1) by wedging thereof on a biconical intermediate support 3, I make use of two, male and female, nuts 4 and 5. These nuts are caused to act, at least at the beginning of the tightening operation, not directly on the conical ends 6 and 7 of said pipes but on rings or groups of rings 8, each of these rings or groups of rings bearing on one side on shoulders provided in said nuts and acting, one the other side, on the corresponding conical portion, to wit 6 or 7.

If these conical portions 6 and 7 are made of a conicity β slightly greater than the conicity α of support 3, see Fig. 3, the whole can be arranged to work in the following manner (which however should be considered as corresponding only to an example):

The parts are made so that, at the beginning of the tightening operation, ring 8 comes at B, slightly beyond the free edge A of support 3.

From this time on, the tightening effort produces a slight stretching or drawing of the conical end 6 or 7 of the pipe, and also a slight displacement of said pipe with respect to support 3 and a deformation which tends to reduce conicity β so as to adapt it to conicity α.

It should be noted that the effort to be developed on the nuts for obtaining the desired tightening remains relatively small, due to the fact that said nuts are not still in contact with the pipes but are merely in contact with the rings and can easily slide on the latter.

Finally, as the tightening operation is being completed, the edge 9 of the rings comes to penetrate into the metal of the pipes and becomes fixed thereon, forming ridges 10 which ensure a perfect fluidtightness.

I may further arrange things so that the end bore 11 of each nut comes itself, at the end of the tightening operation, into contact, at least partly, with the pipe. It should be noted that it is advantageous to give this bore a certain conicity, preferably of a value γ smaller than β, for instance averaging α.

All that has been said above applies of course to any other kind of coupling device.

For instance, in Fig. 4, I have shown a coupling device of the male nut type 12, which comes to screw inside a piece $3^1$ playing a part analogous to that of the biconical support 3 of the first embodiment.

According to still another feature of the invention, the device is so made that the part adapted to exert the tightening action, has, in axial section, an active edge of a form corresponding to an angle of at most 90°; and preferably slightly acute.

When this part is constituted, as above supposed, by a ring, it is sufficient, as shown by Figs. 1 to 4, to make the inner surface of the ring of cylindrical shape and to give it plane faces perpendicular to the axis.

But, it is advantageous, especially in the case of pipes of metals which are relatively hard, to make the angle C corresponding to the active edge 9 (Figs. 5 and 6) an acute angle.

This result is obtained, in the case illustrated by Fig. 5, by providing a recess 13 in the lateral face of the ring adjacent to said edge 9.

In the embodiment of Fig. 6, this acute angle C is obtained by giving the inner bore of the ring a certain conicity in a direction opposed to that of the pipe.

Of course, it should be well understood that, in each case, the matter of which the rings are made is to be chosen in accordance with the nature of the matter of which the tubes or pipes are made. These tubes or pipes may be made of all kinds of metals, such as copper, brass, aluminium, light alloys, steel, etc.

As a rule, the rings are made of a hardness much greater than that of the tubes or pipes. For instance, they will be made of high strength brass, aluminium brass, duralumin, soft steel, semi-soft steel or higher steels.

The rings can be subjected to any suitable surface treatments, for instance in order to avoid galvanic effects with the metal of the tubes, for instance cadmium plating, copper plating anodic oxidizing, and so on.

On the other hand, these rings can be subjected to any suitable thermic treatment (cementation, nitriding, cyaniding, tempering, etc.).

Whatever be the particular embodiment that is chosen, I obtain a coupling device the operation of which results sufficiently clearly from the preceding description for making it unnecessary to enter into further explanations.

The coupling devices according to the invention have, over other coupling devices as made prior to this invention, many advantages among which the following may be cited:

Separation of the elements coupled together is made impossible;

The tightening operations are greatly facilitated;

The coupling device is simple and cheap to manufacture.

Attention is called to the fact that the coupling devices according to the invention are advantageous to use for the assembly of tubular conductors for high voltage currents, these conductors being made of copper or light metals.

Of course, the features above described, and in particular those relating to the relative conicities of the surfaces intended to come into contact with one another can be applied, according to the invention, even in the case of coupling devices unprovided with rings as above mentioned.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device for joining tubular elements which comprises a bi-conical support, tubular elements having flared portions adapted to fit over said support, interlocking means disposed about the ends of said tubular elements for effecting the joinder of said tubular elements, and gripping means within said interlocking means for transmitting the thrust exerted upon the interlocking of said joining means and directly engaging under pressure the material of said tubular elements, said gripping means comprising a ring encircling the flared end of one of the tubular elements, said ring being larger in internal diameter than the unflared portion of the tubular element and than the smaller end of the flared portion but smaller in inside diameter than the larger end of the flared portion of the tubular element whereby said ring is free to rotate and slide along the tubular element as far as the larger end portion of the tubular element and said ring being smaller in external diameter than the interior of said interlocking means, whereby upon exertion of the thrust of the interlocking means said ring can move freely along the flared end of the tubular element without deformation to reach and grip the said larger end of the tubular element.

2. A device for joining tubular elements which comprises a bi-conical support, tubular elements adapted to fit over said support, relatively movable interlocking means disposed about the ends of said tubular elements for effecting the joinder of said tubular elements, the apex angles of the conical surfaces of one of said elements being slightly smaller than the other to allow a gradual intercontact of said elements.

3. A device for joining tubular elements having flared terminals, said device comprising a support having oppositely angulated conical surfaces entering the flared terminals, interlocking members disposed about said flared terminals for joining said terminals, and gripping means comprising a ring freely slidable and rotatable on at least one of the flared terminals as far as a point adjacent the larger end of the terminal, said ring being smaller in outside diameter than and spaced from the interior of the corresponding interlocking member, said interlocking member having a shoulder arranged to engage only the outer side of the ring so as to force the ring inwardly as the interlocking member is operated toward final interlocked position substantially without deformation of the ring whereby the inner edge of the ring bites into the material adjacent to the larger end of the flared portion.

4. A device according to claim 3 wherein said ring is of substantially rectangular transverse cross section.

5. A device according to claim 3 wherein said ring is of substantially rectangular transverse cross section and is relatively narrow measured in an axial direction.

EDMOND GABRIEL LAFFLY.